United States Patent [19]

Remensperger

[11] 3,806,298

[45] Apr. 23, 1974

[54] APPARATUS FOR MECHANICALLY TREATING DOUGH

[75] Inventor: Franz Remensperger, St. Georgen, Black Forest, Germany

[73] Assignee: Fr. Winkler KG Spezialfabrik fur Backereimaschinen und Backofen, Villingen Black Forest, Germany

[22] Filed: Sept. 13, 1972

[21] Appl. No.: 289,824

[30] Foreign Application Priority Data
Sept. 17, 1971 Germany............................ 2146554

[52] U.S. Cl................. 425/371, 425/332, 425/335, 425/363, 425/372, 425/366
[51] Int. Cl............................................ B29c 15/00
[58] Field of Search .......... 425/363, 366, 371, 372, 425/445, 440, 322, 335

[56] References Cited
UNITED STATES PATENTS
787,274   4/1905   Burns............................. 425/335 X
3,038,418   6/1962   Gugler............................. 425/372

FOREIGN PATENTS OR APPLICATIONS
62,731   8/1913   Germany............................ 425/371
1,052,885   3/1959   Germany............................ 425/371

Primary Examiner—Robert L. Spicer, Jr.
Attorney, Agent, or Firm—Eric H. Waters

[57] ABSTRACT

Apparatus for mechanically treating dough comprising advancing a piece of dough on a longitudinally advancing run of a first endless driven belt, and applying transverse forces to the piece of dough at the upper surface thereof to elongate the piece of dough transversely as it advances longitudinally. The transverse forces are applied to the piece of dough by means of two runs of two additional endless belts which travel in opposite directions away from one another. The piece of dough also undergoes compression as it advances due to a diminishing spacing between the first endless belt and the two additional belts.

10 Claims, 3 Drawing Figures

APPARATUS FOR MECHANICALLY TREATING DOUGH

BACKGROUND a. Field of the Invention

The invention relates to an apparatus for mechanically treating pieces of dough by longitudinally rolling and/or stretching the pieces of dough.

b. Prior Art

It is known to shape pieces of dough in various ways to form dough rolls i.e., elongated products which can be baked or made ready for further treatment preparatory to baking. By way of example, it is known to introduce dough pieces, which are either round or longitudinally pre-shaped between two belt conveyors which are arranged one above the other, wherein the respective velocities of the belt conveyors differ from each other in such a manner that the dough pieces are advanced from the beginning of the lower conveyor belt to the end of the lower conveyor belt, while being simultaneously subjected to elongational rolling or stretching. Herein, the upper belt conveyor can be moved in the same direction or in the opposite direction with respect to the lower belt conveyor in such a manner that it is possible to control the resulting speed of travel of the dough pieces from the beginning of the lower belt conveyor to the end thereof. The two belt conveyors may be inclined relative to one another such that the distance between corresponding points of the two belt conveyors diminishes from the starting point of the rolling movement to its finishing point.

The lengths and the diameters of the elongationally rolled or stretched dough pieces can be made to comply with respective requirements by changing the velocities of the two conveyors and the angle enclosed by the two belt conveyors.

In yet another conventional method, the dough pieces which are to be elongationally rolled or stretched are fed between a lower elongated rolling belt conveyor which is continuously driven and a channel or a board arranged above the belt conveyor and inclined with respect thereto, and thus the dough pieces are elongationally rolled and stretched simultaneously. Herein, the lengths and the diameters of the elongationally rolled or stretched dough pieces can also be controlled to a desired degree by adjustment of the spacing and the inclination between the lower conveying and rolling belt and the board or channel located thereabove.

The conventional methods and apparatus have the disadvantages that they necessitate relatively long travelling paths of the dough pieces to be elongationally rolled or stretched, and the end portions of the dough rolls are subjected to twisting distortions which adversely affect their texture.

SUMMARY OF THE INVENTION

It is an object of the present invention to provide apparatus by which the dough pieces can be shaped into rolls having arbitrarily selectable lengths and diameters, over the shortest possible path while being subjected to a minimum distortion of their texture.

The invention substantially resides in that the dough pieces, which are moved on a lower conveying surface and which are longitudinally rolled or stretched by coming into contact with at least one upper conveying surface, are subjected during the elongational rolling or stretching operation to two rolling forces at the upper conveying surface acting in mutually opposite directions toward the opposing sides of the apparatus. The rolling forces which are achieved in this manner and which are directed outwardly, i.e., approximately transversely to the actual rolling movement, and which act in opposing directions to each other, result in a gentle elongational stretching of the dough pieces during their rolling movement on the lower belt conveyor. Thusly, the dough pieces are significantly stretched without a detrimental effect on their texture, this being effected quickly and along a relatively short path, in gentle fashion.

A preferred embodiment of the apparatus includes two conveying surfaces located above a lower conveying surface and spaced therefrom at a distance which gradually decreases in the direction of travel of the dough pieces, the upper conveying surfaces being driven in opposite directions approximately transversely to the direction of travel of the dough pieces and outwardly of the pieces.

In the simplest case, both upper conveying surfaces are aligned with each other in the same plane. In order to produce additional kneading forces, by means of the conveying surfaces, in the direction of movement of the lower conveying surface according to another embodiment of the invention, the two upper conveying surfaces can be arranged at a controllable angle with each other. The lengths and the diameters of the dough pieces to be longitudinally rolled or stretched can be preferably controlled in the desired manner so that the distance and/or the inclination of the upper conveying surfaces with respect to the lower conveying surface are adjustable. Additionally, in order to achieve the same objective, the velocities of the transverse movements of the upper conveying surfaces can be controllable either separately or jointly. In the same manner, the velocity of the lower conveying surface can also be made controllable in known manner. Preferably, the conveying surfaces are constituted by endless circulating belts. However, this does not preclude the possibility that the three conveying surfaces can be constructed as roller-like acting treating plates which are driven by eccentrics in such a manner that they cause the transportation of the dough pieces in the main direction while providing the opposing elongational or stretching movements in the transverse direction.

BRIEF DESCRIPTION OF THE DRAWING

In the appended drawing there is illustrated a preferred embodiment for realization of the method according to the invention. In the drawing.

DETAILED DESCRIPTION

Figure 2:
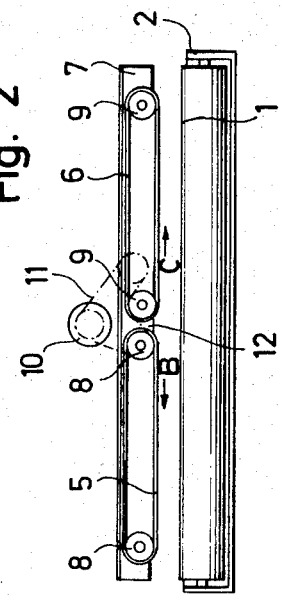
FIG. 2 is a rear elevational view thereof.
Figure 1:
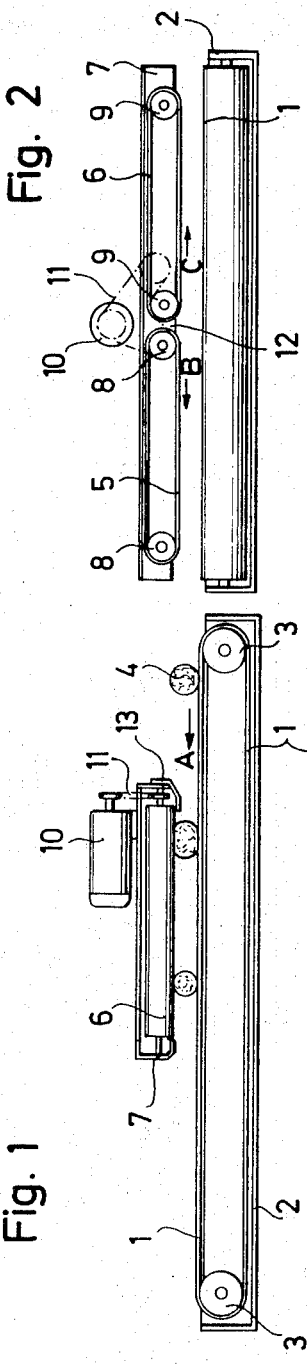
FIG. 1 is a side elevational view of apparatus embodying the invention.

The illustrated apparatus includes an endless conveying belt 1 which is guided over two rollers 3 which are rotatably supported in a frame 2. One of these rollers is driven in the counterclockwise direction, so that the belt conveyor 1 moves in the direction of the arrow A to carry pieces of dough 4 which are placed on conveyor 1.

Figure 3:
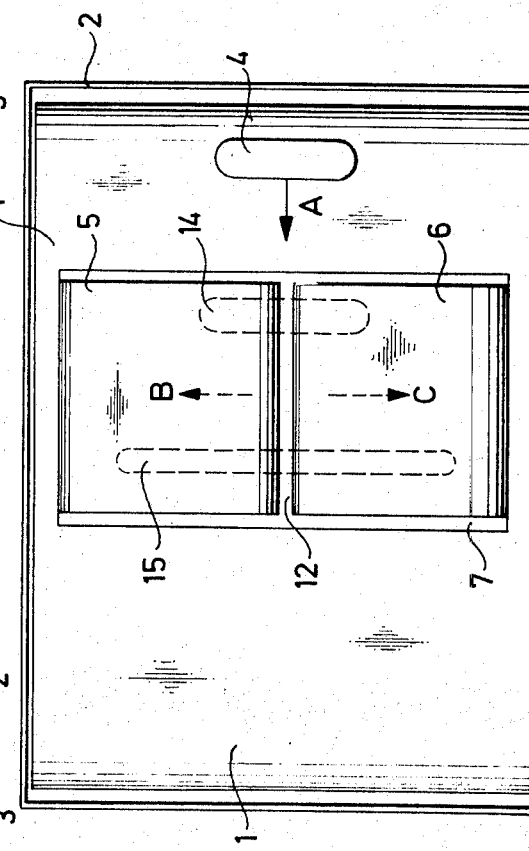
FIG. 3 is a top plan view thereof.

Two further endless belts 5 and 6 are located above the belt conveyor 1 and extend transversely of the belt conveyor 1. The belts 5 and 6 are aligned with each other as seen in FIGS. 2 and 3 and they are guided over two pairs of rollers 8 and 9 which are rotatably supported in frame 7. The pairs of rollers 8 and 9 are driven by a controllable driving means 10, which is attached to the frame 7, through a drive means 11 which may be a gear drive, a chain drive or a belt drive or other suitable means. The belts 5 and 6 are driven in opposite directions as shown by the arrows B and C respectively.

An intermediate space 12 is formed between the inner, mutually facing rollers 8 and 9, and a metal sheet 13 or the like closes this space to prevent entry of the dough.

The lower rolling surface which is defined by the upper length of the conveying belt 1 and the upper rolling surfaces which are formed by the lower lengths of the two belts 5 and 6 are inclined in relation to each other such that the spacing therebetween diminishes in the direction of the arrow A, i.e., from right to left in the illustrated embodiment. The spacing of the rolling surfaces, as well as their relative inclination in the direction of the arrow A may be adjusted by an adjusting means which is not shown in detail and which may be arranged on one or on both of the frames 2 and 7, in such a manner, that the kneaded rolls at the end of the mechanical treatment have a desired length and diameter.

Moreover, the upper rolling belt conveyors 5 and 6 may, instead of being aligned with each other as shown in FIG. 2, be arranged so as to enclose a selectable angle with each other, while still extending transversely to the lower rolling belt 1.

Finally, the velocity of the lower rolling belt 1 as well as that of the upper rolling belts 5 and 6 can be arbitrarily adjustable in order to obtain different lengths of the rolled dough ropes.

It is evident from the illustration shown in FIG. 3 that the dough pieces 4 which are successively placed on the belt conveyor 1 are advanced in the direction of the arrow A until they reach the rolling belts 5 and 6, and then they pass below the same. As a result of the diminishing spacing between the upper surface of the conveyor belt 1 and the lower surface of belts 5 and 6, the already elongated dough pieces 4 are elongated and stretched even further. As a result of the opposite transverse movements of the rolling belts 5 and 6, there are produced lateral force components in the directions of the arrows B and C, which cause an additional elongation and stretching of the dough pieces. The dough pieces 4 are gradually compressed while being rolled and brought to the desired length, as they pass between belt 1 and belts 5 and 6. This gradual shaping is illustrated by the two intermediate stages 14 and 15 as shown in broken lines in FIG. 3.

What is claimed is:

1. Apparatus for mechanically treating dough comprising first and second conveyor means spaced from one another and providing opposed surfaces between which a piece of dough can be advanced longitudinally, said first conveyor means including first and second conveyor members with respective surfaces which are driven in opposite directions away from one another for applying transverse forces to the piece of dough as it is advancing longitudinally to elongate the piece of dough transversely.

2. Apparatus as claimed in claim 1 wherein the opposed surfaces of the first and second conveyor means are inclined towards one another to provide a diminishing spacing therebetween in the direction of longitudinal advancement of the piece of dough.

3. Apparatus as claimed in claim 2 wherein said surfaces of the first and second conveyor members are aligned in a common plane.

4. Apparatus as claimed in claim 2 wherein said surfaces of the first and second conveyor members are inclined relative to one another.

5. Apparatus as claimed in claim 4 wherein the inclination between the surfaces of the first and second conveyor members is adjustable.

6. Apparatus as claimed in claim 2 wherein the spacing between the surfaces of the first and second conveyor members and said second conveying means is adjustable.

7. Apparatus as claimed in claim 2 comprising means for adjusting the speed of travel of the surfaces of the first and second conveyor members.

8. Apparatus as claimed in claim 2 comprising means for adjusting the speed of travel of the surface of said second conveyor means.

9. Apparatus as claimed in claim 2 wherein said first and second conveyor means comprise endless belts.

10. Apparatus as claimed in claim 2 wherein said second of said conveyor means comprises an endless conveyor belt with a substantially horizontal upper length which travels longitudinally and on which the piece of dough is longitudinally advanced, said first and second conveyor members of said first conveyor means comprising respective endless belts above said second conveyor means and including lower lengths which travel transversely.

* * * * *